(12) United States Patent
Wicks

(10) Patent No.: US 8,120,913 B2
(45) Date of Patent: Feb. 21, 2012

(54) METHODS AND DEVICES FOR FORCED AIR COOLING OF ELECTRONIC FLIGHT BAGS

(75) Inventor: Curtis Wicks, Prior Lake, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 218 days.

(21) Appl. No.: 12/493,304

(22) Filed: Jun. 29, 2009

(65) Prior Publication Data

US 2010/0328877 A1    Dec. 30, 2010

(51) Int. Cl.
*H05K 7/20* (2006.01)
(52) U.S. Cl. .................. 361/696; 361/694; 361/695
(58) Field of Classification Search .................. None
See application file for complete search history.

(56) References Cited

U.S. PATENT DOCUMENTS

| | | | |
|---|---|---|---|
| 5,689,403 A * | 11/1997 | Robertson et al. ............ 361/695 |
| 5,831,822 A | 11/1998 | Hulick et al. |
| 6,003,068 A * | 12/1999 | Sopko .......................... 709/205 |
| 6,430,042 B1 * | 8/2002 | Ohashi et al. ............ 361/679.49 |
| 6,650,540 B2 | 11/2003 | Ishikawa |
| 6,798,655 B2 | 9/2004 | Nagashima et al. |
| 6,940,717 B2 | 9/2005 | Shih-Tsung |
| 6,987,668 B2 | 1/2006 | Kitano et al. |
| 7,068,508 B2 | 6/2006 | Patel et al. |
| 7,262,963 B2 | 8/2007 | Yu et al. |
| 7,269,005 B2 | 9/2007 | Pokharna et al. |
| 7,312,985 B2 | 12/2007 | Lee et al. |
| 7,333,330 B2 | 2/2008 | McEwan |
| 7,403,384 B2 | 7/2008 | Pflueger |
| 7,680,250 B1 * | 3/2010 | Zilles et al. ........................ 379/9 |
| 7,755,890 B2 * | 7/2010 | Rui et al. .................. 361/679.55 |
| 7,872,864 B2 * | 1/2011 | Mongia et al. ................ 361/695 |
| 2006/0023420 A1 * | 2/2006 | Tucker et al. ................. 361/695 |
| 2009/0243895 A1 * | 10/2009 | Mitchell et al. ............... 340/971 |
| 2010/0071881 A1 | 3/2010 | Murer et al. |
| 2010/0100225 A1 * | 4/2010 | Reed et al. ..................... 700/213 |

* cited by examiner

*Primary Examiner* — Gregory Thompson
(74) *Attorney, Agent, or Firm* — Scott D. Wofsy; Edwards Wildman Palmer LLP

(57) ABSTRACT

An electronic flight bag computer (EFB) includes a housing defining first and second compartments that are fluidly isolated from and in thermal communication with one another. The first compartment contains electronic components connected to a user interface on an exterior portion of the housing for providing interactive flight related computation functions to a user. The second compartment contains a forced convection cooling component in thermal communication with the electronic components. The forced convection cooling component directs a flow of cooling fluid into the second compartment to convey heat produced by the electronic components out of the housing, such that the cooling fluid in the second compartment remains fluidly isolated from the electronic components in the first compartment of the housing.

14 Claims, 4 Drawing Sheets

METHODS AND DEVICES FOR FORCED AIR COOLING OF ELECTRONIC FLIGHT BAGS

BACKGROUND OF THE INVENTION

1. Field of the Invention

The present invention relates to cooling of electronic components, and more particularly to cooling systems for electronics onboard aircraft.

2. Description of Related Art

Electronic Flight Bags (EFB's) are computers used by aircraft crews as a replacement for the traditional flight bags containing charts and flight data formerly carried by pilots onto aircraft. An EFB provides electronic maps, weather information, and other information for use by flight crews in flying modern aircraft. A typical EFB is integrated with the cockpit and is not typically removed from the cockpit except for maintenance or replacement.

Temperature control for electronic components, and particularly computer processors, is an issue for computing devices like EFB's. Various measures have been taken to maintain safe temperatures for electronic components in computers, which vary from application to application. Electronics used in aerospace applications must have a high degree of reliability compared to non-aerospace electronic equipment in general. Since motors such as those used in typical cooling fans have a relatively low reliability compared to electronics typically used in aerospace applications, fans are often not used in conventional EFB equipment because it is necessary to replace a typical cooling fan before what is considered a reasonable time to failure. Moreover, in conventional EFB's using a cooling fan to blow air over electronic components can lead to early failure of an EFB if common contaminants like dust, moisture, or salt are entrained in the airflow. Additionally, fans may of themselves also lead to early failure of EFB's. Fans can fail due to vibration and temperature extremes, which reduces the Mean Time to Failure of an EFB. Instead of cooling fans, many conventional EFB's employ elaborate passive cooling provisions which typically add cost and bulk to the design. These traditional means for cooling EFB's may also result in a compromise in capability or reduced operating environmental limits.

The conventional systems and methods have generally been considered satisfactory for their intended purposes. However, there still remains a continued need in the art for an EFB with a smaller form factor with acceptable power dissipation. There also remains a need in the art for such an EFB that is easy to make and use. The present invention provides a solution for these problems.

SUMMARY OF THE INVENTION

The subject invention is directed to a new and useful electronic flight bag computer for providing flight data to aircraft pilots. The electronic flight bag computer includes a housing defining first and second compartments that are fluidly isolated from and in thermal communication with one another. The first compartment contains electronic components connected to a user interface on an exterior portion of the housing for providing interactive flight related computation functions to a user. The second compartment contains a forced convection cooling component in thermal communication with the electronic components. The forced convection cooling component directs a flow of cooling fluid into the second compartment to convey heat produced by the electronic components out of the housing, such that the cooling fluid in the second compartment remains fluidly isolated from the electronic components in the first compartment of the housing.

In certain embodiments, the forced convection cooling component includes a fan configured to direct cooling air from outside the housing into the second compartment and to direct heated air from the second compartment to outside the housing. The fan can be electrically connected to the electronic components in the first compartment of the housing by a wire harness for providing power to the fan. The first and second compartments of the housing can be in thermal communication by way of a thermally conductive path component configured to conduct heat from the first compartment to the second compartment.

It is also contemplated that in certain embodiments, the electronic components include a processor in the first compartment of the housing with a heat receiver. The second compartment of the housing includes a heat exchanger spaced apart from the processor. A thermally conductive path component thermally connects the heat receiver in the first compartment to the heat exchanger of the second compartment.

In accordance with certain embodiments, the second compartment includes a heat exchanger in thermal communication with the electronic components of the first compartment. The forced convection cooling component includes a fan in the second compartment of the housing. The housing includes an intake port proximate the fan and an exhaust port proximate the heat exchanger. The intake port and exhaust port can be defined in at least one removable access panel of the housing. The removable access panel can be configured to be removed and replaced from the housing to provide access to the second compartment of the housing while maintaining the first compartment of the housing fluidly isolated from the second compartment of the housing.

The invention also includes an electronic flight bag computer for providing flight data to aircraft pilots having a removable fan module. A housing defines first and second interior compartments therein. The first and second interior compartments are fluidly isolated and in thermal communication with one another. The first compartment contains electronic components connected to a user interface on an exterior portion of the housing for providing interactive flight related computation functions to a user. The removable fan module is in the second compartment of the housing. The fan module is configured and adapted to direct a flow of cooling fluid into the second compartment to convey heat produced by the electronic components out of the housing, such that the cooling fluid remains fluidly isolated from the first compartment of the housing. The fan module is configured and adapted to be removed and replaced from the second compartment of the housing while maintaining fluid isolation between the first and second compartments of the housing.

In certain embodiments, the fan module includes a fan that is electrically connected to the electronic components in the first compartment of the housing by a docking connection for providing power to the fan. The fan module can be configured and adapted to be removed and installed from the second compartment of the housing with the housing on board an aircraft. It is also contemplated that the fan module and electronic components can be configured and adapted to continue operation of the electronic components throughout removal of the fan module from the second compartment. The fan module can be connected to the housing by sliding, stuffing, clipping, strapping, sticking, and/or fastening.

The invention also includes a fan module for an electronic flight bag computer for providing flight data to aircraft pilots. The fan module includes a fan housing configured and adapted to be removably docked in an electronic flight bag computer housing. A fan within the fan housing is configured to rotate about an axis to drive a flow of cooling fluid to provide forced convection cooling for electronic components in the electronic flight bag computer housing. An inlet is defined in the fan housing and is configured to accommodate passage of cooling fluid outside the fan housing into the fan within the fan housing along a direction substantially in line with the axis of the fan. An outlet is defined in the fan housing opening in a direction substantially perpendicular to the inlet of the fan housing. The outlet is configured and adapted to channel a flow of cooling fluid from the fan to cool components within the electronic flight bag computer housing. An electrical connection is configured and adapted to electrically couple the fan to a power source in the electronic flight bag computer housing to power the fan. The fan housing and electrical connection are configured and adapted to be installed and removed from the electronic flight bag computer housing with the remainder of the electronic flight bag computer housing in tact.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 2:
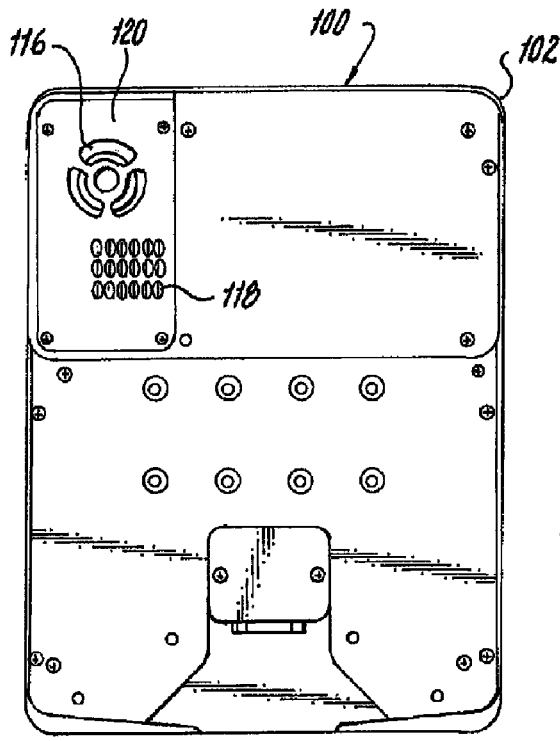
FIG. 2 is a rear view of an EFB constructed in accordance with the present invention, showing a removable panel covering a cooling compartment in the EFB housing.

Reference will now be made to the drawings wherein like reference numerals identify similar structural features or aspects of the subject invention. For purposes of explanation and illustration, and not limitation, a partial view of an exemplary embodiment of an electronic flight bag in accordance with the invention is shown in FIG. 2 and is designated generally by reference character 100. Other embodiments of electronic flight bags in accordance with the invention, or aspects thereof, are provided in FIGS. 3-8, as will be described. The systems of the invention can be used for cooling electronic flight bag electronic components while providing a favorable form factor.

Figure 1:
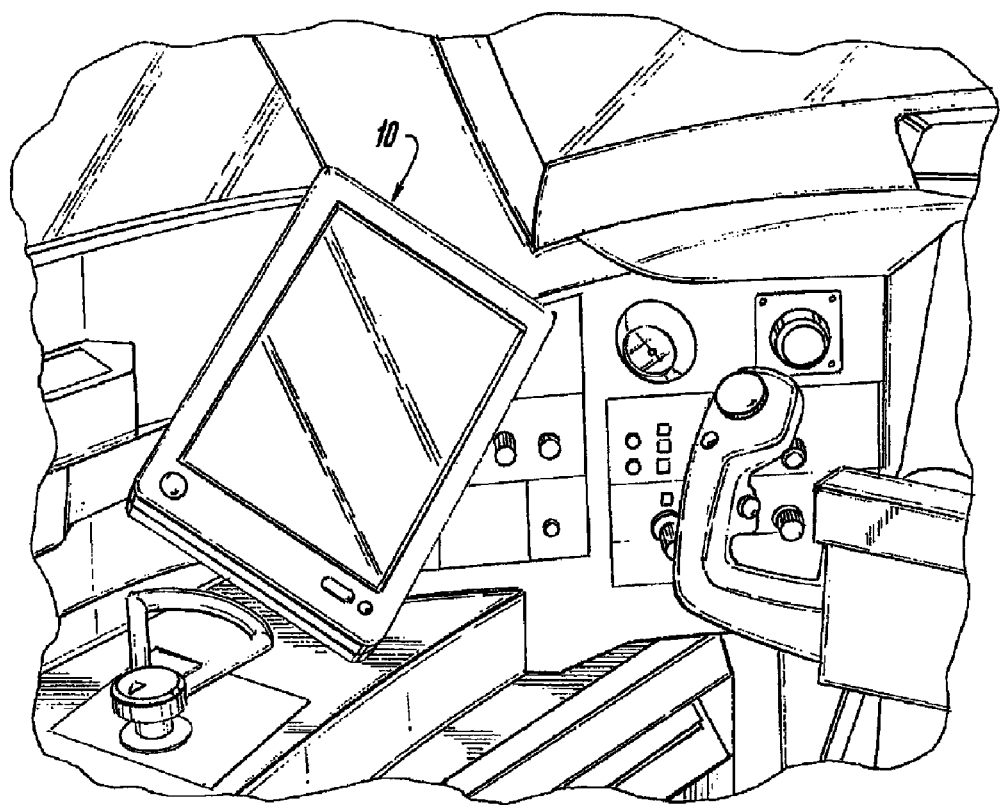
FIG. 1 is a perspective view of a prior art cockpit, showing an electronic flight bag (EFB) for providing flight data to pilots.

As shown in FIG. 1, an electronic flight bag computer (EFB) 10 is commonly used to replace the paper charts, manuals, and other references traditionally carried on board in pilots' flight bags. An EFB is a computer with a display for showing moving maps, weather patterns, technical data and other information.

Figure 3:
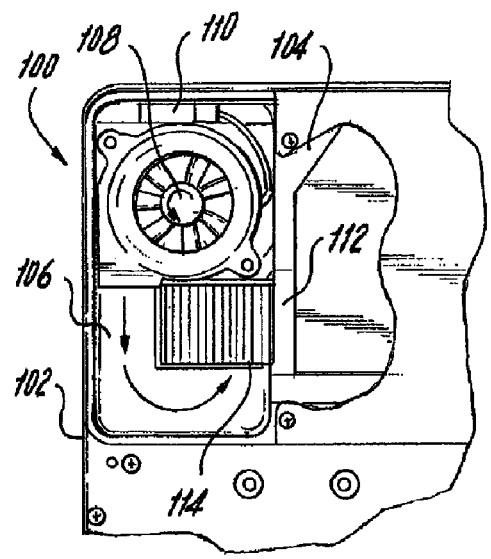
FIG. 3 is an enlarged partially cut away view of a portion of the EFB of FIG. 2, showing the cooling compartment with the access panel removed to reveal the fan module and heat exchanger.

FIG. 2 shows an EFB 100 constructed in accordance with the present invention. EFB 100 includes a housing 102 defining first and second compartments that are fluidly isolated from and in thermal communication with one another. FIG. 3 shows an enlarged view of EFB 100 with a portion of housing 102 removed. First compartment 104 contains electronic components connected to the user interface on an exterior portion of housing 102 (not shown in FIG. 2, but see FIG. 1) for providing interactive flight related computation functions to a user. Second compartment 106 contains a forced convection cooling component that includes fan module 108 that is in thermal communication with the electronic components in first compartment 104. The cooling fluid in second compartment 106 remains fluidly isolated from the electronic components in first compartment 104 of housing 102.

Fan module 108 includes a fan configured to direct cooling air from outside housing 102 into second compartment 106 and to direct heated air from second compartment 106 to the area outside housing 102, as indicated by arrows in FIG. 3. The fan is electrically connected to the electronic components in first compartment 104 by way of a docking connection 110 to provide power for driving the fan. First and second compartments 104 and 106 of housing 102 are in thermal communication with one another by way of a thermally conductive path component 112 configured to conduct heat from the electronics in first compartment 104 to second compartment 106 for removal by the cooling air.

The electronic components in EFB 100 include one or more processors in first compartment 104 having a heat receiver. Second compartment 106 includes a heat exchanger 114 spaced apart from the processor in first compartment 104. Thermally conductive path component 112 thermally connects the heat receiver in first compartment 104 to heat exchanger 114 in second compartment 106. Thus heat exchanger 114 is in thermal communication with the electronic components of first compartment 104. Those skilled in the art will appreciate that conductive path component 112 can be combined as a single component with a heat receiver, as in heat receiver 232 described below, or can be separate from but in thermal communication with the heat receiver.

Figure 4:
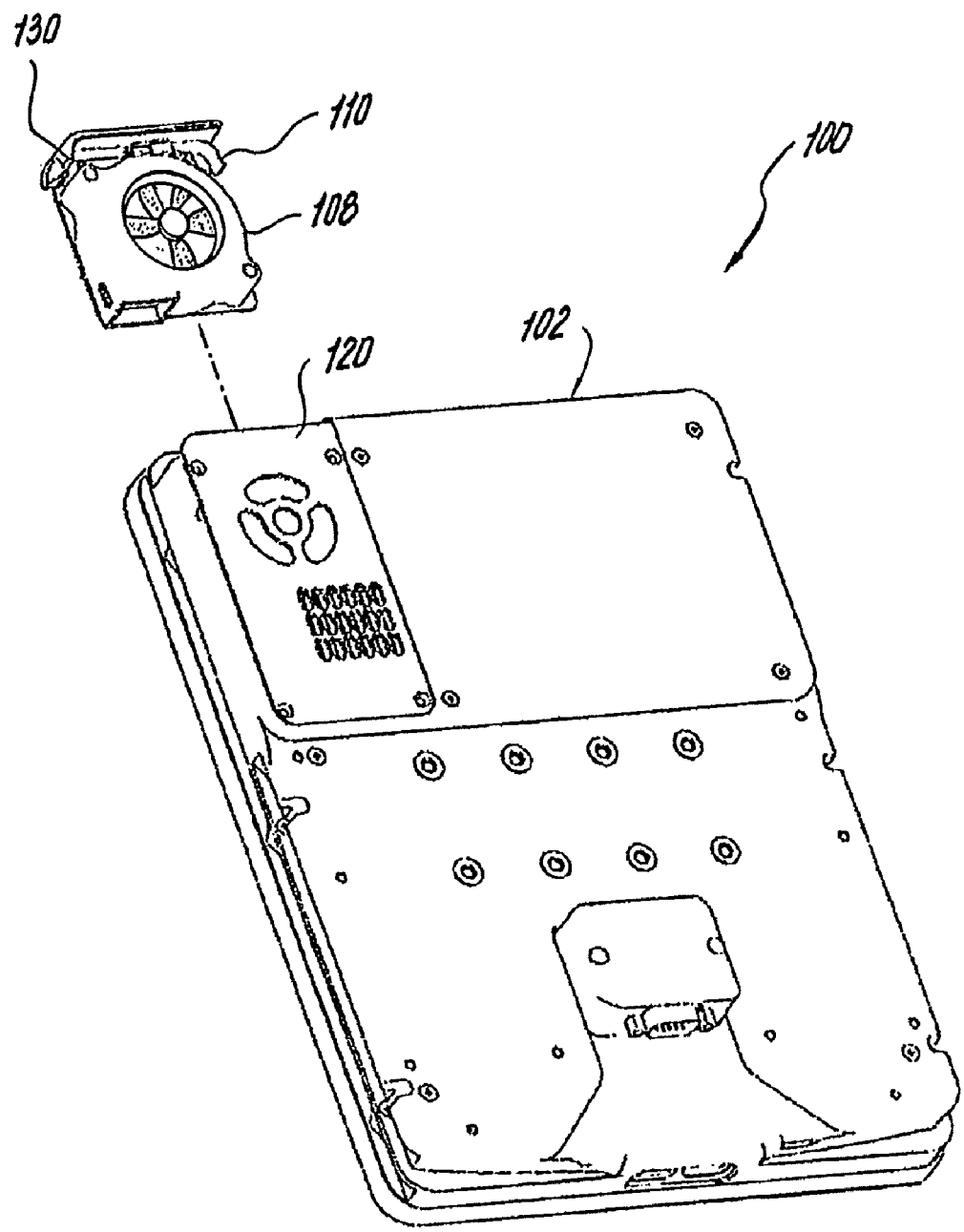
FIG. 4 is a perspective view of the EFB of FIG. 2, showing the fan module removed.

Referring again to FIG. 2, housing 102 includes an intake port 116 proximate the fan and an exhaust port 118 proximate heat exchanger 114. Intake port 116 and exhaust port 118 are defined in a removable access panel 120. Removable access panel 120 can be removed and replaced from housing 102 to provide access to second compartment 106 while maintaining first compartment 104 fluidly isolated from second compartment 106. As indicated in FIG. 4, fan module 108 with docking connection 110 can be installed and removed from housing 102 by docking through an opening in the side of housing 102 with the remainder of housing 102 in tact. Due to the side-docking configuration of fan module 108, removal and replacement of fan module 108 can be done with or without removal of access panel 120.

Docking mechanism 130 makes it possible to release and uninstall an old fan module 108 and to install a new fan module 108 without the need for tools. Thus fan module 108 can be changed out without removing EFB 100 from the aircraft, and depending on the cockpit arrangement this may even be possible without removing EFB 100 from its mounting provisions in the cockpit. If the fan used has a non-hazardous low voltage, replacement of fan module 108 can even be accomplished without disabling the equipment. Even if other circumstances require that EFB 100 be removed from the aircraft, the easy removal and installation of fan module 108 can still save time during replacement taking place outside the aircraft.

Figure 5:
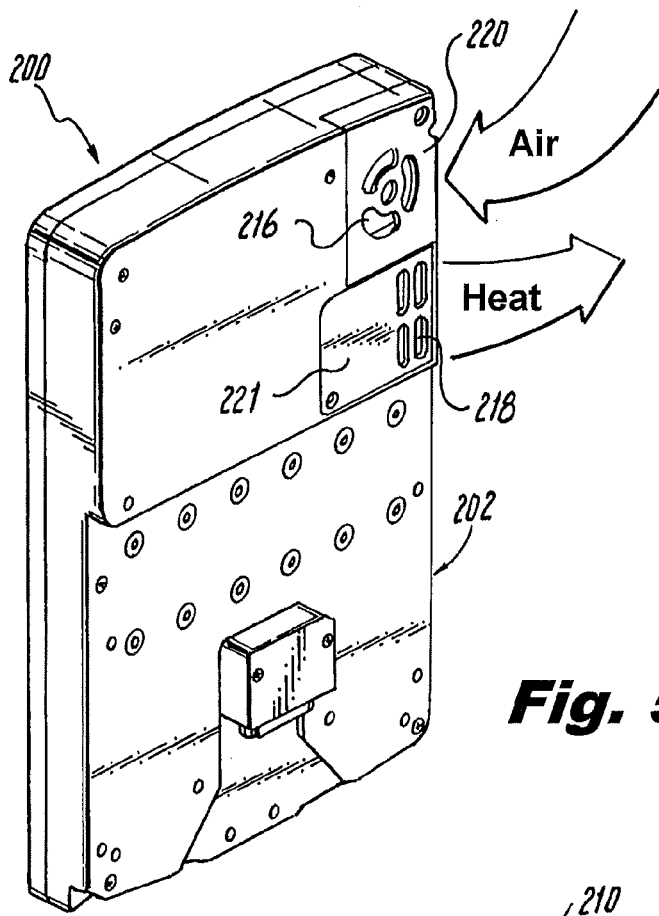
FIG. 5 is a perspective view of another embodiment of an EFB constructed in accordance with the present invention, showing the intake of cool air from the surroundings and the removal of heated air from within the EFB housing.
Figure 6:
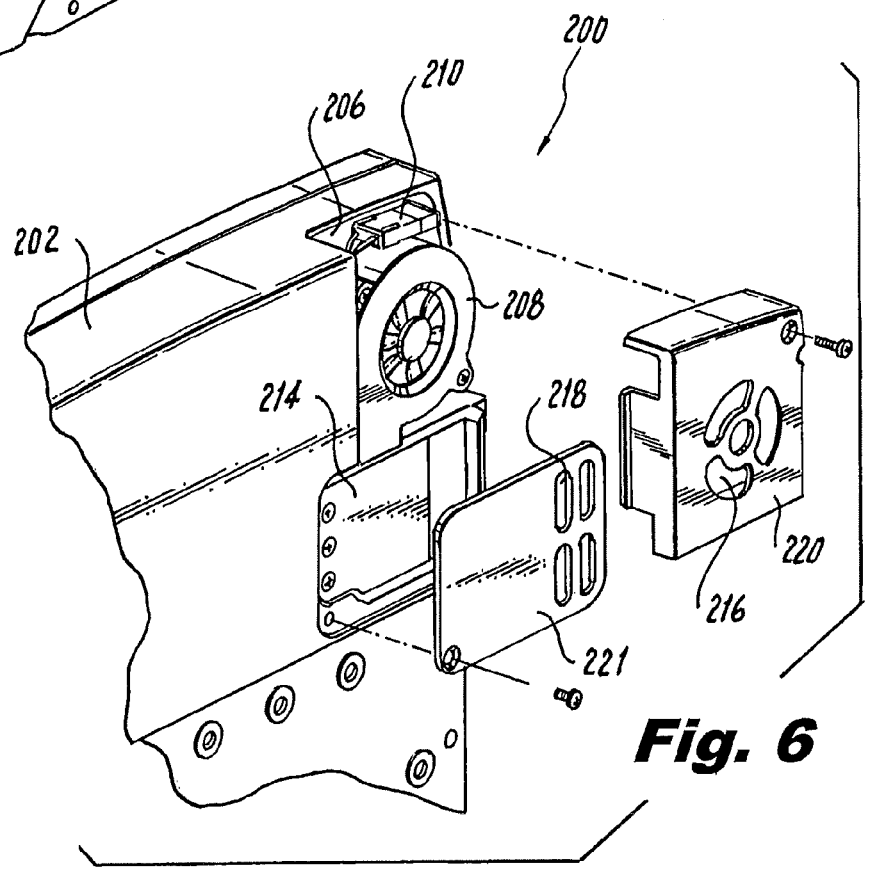
FIG. 6 is a partially exploded perspective view of the EFB of FIG. 5, showing the access panels removed to reveal the fan module and heat exchanger.
Figure 7:
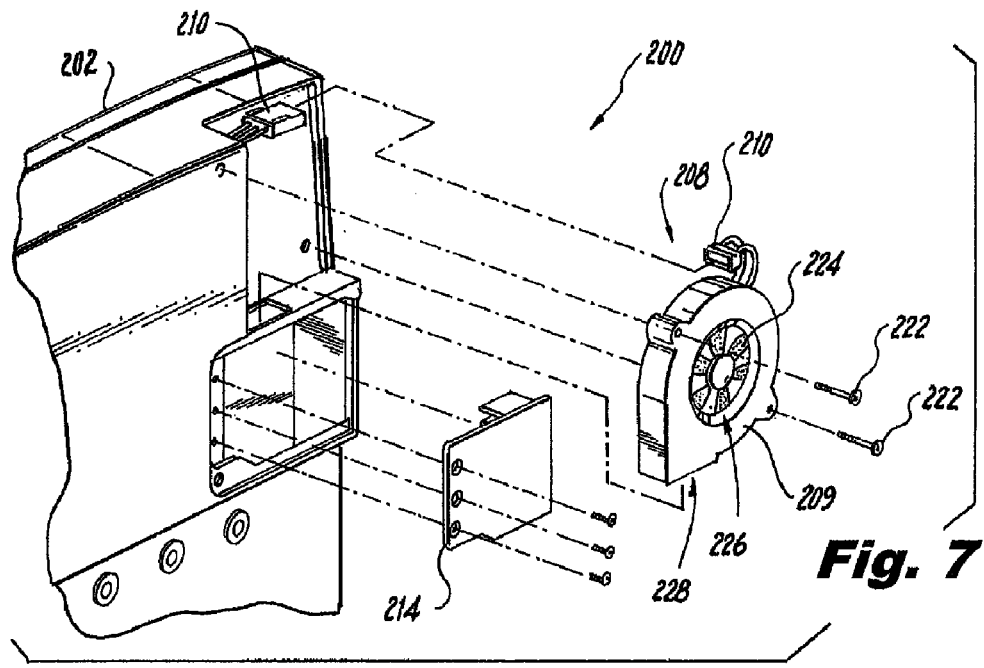
FIG. 7 is a partially exploded perspective view of the EFB of FIG. 6, showing the fan module and heat exchanger removed from the EFB housing.
Figure 8:
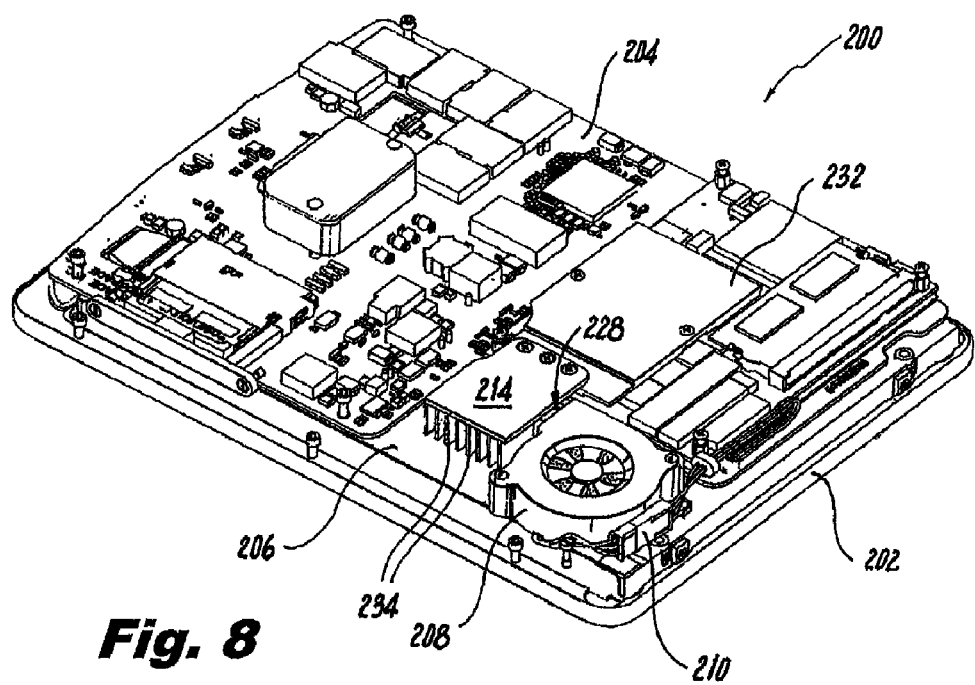
FIG. 8 is a perspective view of the EFB of FIG. 5, showing the rear cover removed to show the heat receiver, heat exchanger, and fan module together with the electronic components within the EFB housing.

FIGS. 5-8 show another exemplary embodiment of an EFB 200 constructed in accordance with the present invention, including a removable fan module 208. FIG. 8 shows EFB 200 with part of housing 202 removed to show first and second compartments 204 and 206, respectively, defined inside housing 202 much as described above with respect to EFB 100. First and second interior compartments 204 and 206 are fluidly isolated and in thermal communication with one another. Removable fan module 208 is in second compartment 206 of housing 202, as shown in FIG. 6. Fan module 208 directs a flow of cooling fluid, such as ambient air, into second compartment 206 and conveys heat produced by the electronic components out of housing 202, as indicated by the large arrows in FIG. 5. The cooling fluid remains fluidly isolated from first compartment 204 and the electronic components therein. Fan module 208 can be removed and replaced from second compartment 206 of housing 202 while maintaining the fluid isolation between first and second compartments 204 and 206.

Fan module 208 is electrically connected to the electronic components in first compartment 204 by a wire harness 210 to provide power to fan 224. FIG. 7 shows fan module 208 removed from housing 202 with the two parts of wire harness 210 disconnected from each other. Fan module 208 can be removed from and installed into second compartment 206 with EFB 200 on board an aircraft. It is also contemplated that fan module 208 can be replaced onboard an aircraft while the electronic components of EFB 200 continue to operate if necessary, as described above. As indicate in FIG. 7, fan module 208 is held in place by fasteners 222 of a type that can be fastened and unfastened with a simple tool. Those skilled in the art will readily appreciate that a fan module can be mechanically connected to an EFB housing by sliding, stuffing, clipping, strapping, sticking, or by any other suitable means without departing from the spirit and scope of the invention.

Fan module 208 includes a fan housing 209 configured and adapted to be removably docked or installed in housing 202, as described above. Fan 224 within fan housing 209 rotates about its axis (as indicated by the circular arrow in FIG. 3, for example) to drive a flow of cooling fluid to provide forced convection cooling for heat generating EFB components. An inlet 226 is defined in fan housing 209 and is configured to accommodate passage of cooling fluid, such as ambient air, outside housing 202 into fan 224 along a direction substantially in line with the axis of rotation of fan 224. An outlet 228 is defined in fan housing 209 opening in a direction substantially perpendicular to inlet 226 of fan housing 209. Outlet 228 channels a flow of cooling fluid from fan 224 through heat exchanger 214 to cool components within housing 202.

As shown in FIGS. 5 and 6, EFB 200 has two access panels 220 and 221. Intake port 216 is defined in access panel 220 and is positioned adjacent fan module 208 when closed. Exhaust port 218 is defined in access panel 221 and is positioned adjacent heat exchanger 214 when closed. Access panel 220 can be opened to access or change out fan module 208. Access panel 221 can be opened to access heat exchanger 214, for example to clear dust and/or other debris from fin members 234 of heat exchanger 214.

Referring now to FIG. 8, heat generated by the electronic components, such as a main processor, is removed from EFB 200 in the following manner. The processor and/or other heat generating components of EFB 200 are in close proximity and thermal communication with heat receiver 232. The heat generating components are not shown, however they are located just under heat receiver 232 as viewed in FIG. 8. Heat receiver 232 receives heat from the heat generating components and conducts the heat to heat exchanger 214. Heat receiver 232 is a metal plate which forms a thermally conductive path from the heat generating components to heat exchanger 214. Those skilled in the art will recognize that a heat pipe, or any other suitable type of thermally conductive path component can be used without departing from the spirit and scope of the invention. Heat exchanger 214 is in thermal communication with heat receiver 232 to receive heat therefrom. Heat exchanger 214 conducts heat from heat receiver 232 to fin members 234. Fin members 234 enhance heat exchange with the cooling fluid.

The flow of cooling fluid, such as air, through EFB 200 includes drawing ambient air through intake port 216 in access panel 220 as indicated in FIG. 5, and into fan module 208. Air is directed from fan module 208 through fin members 234 of heat exchanger 214, where heat from the heat generating components is released from fin members 234 into the passing airflow by the process of forced convection. The heated air passes out of housing 202 through exhaust port 218 in access panel 221, as indicated in FIG. 5.

Using a cooling fan to transfer heat from the equipment to the ambient environment provides a favorable power dissipation vs. form factor ratio for an EFB when compared with conventional EFB's that utilize elaborate passive cooling provisions. Utilizing forced air cooling provides high power, low cost heat dissipation. A cooling fan module can be replaced on an as-needed basis, such as arising from abnormally loud operation or contamination with dust, or on a preventative maintenance basis as appropriate.

Second compartments 106 and 206 of EFB's 100 and 200 are in thermal contact with the heat generating components in first compartments 104 and 204, respectively, to allow for removal of excess heat produced during operation. Nonetheless, the cooling fluid, e.g. air, flowing through second compartments 106 and 206 is isolated from the heat generating components in first compartments 104 and 204, respectively. Keeping the cooling air flow isolated from the electronic components protects the electronic components from dust, salt, moisture, and other potentially harmful contaminants that may be entrained in the air flow. This fluid isolation protects the electronic components from premature failure caused by shorting, loss of insulation resistance, bonding joint contamination, and the like. Only components in second compartments 106 and 206, such as the fan module and heat exchanger, are exposed to airborne contaminants and these exposed components can readily be cleaned or replaced as described above.

The methods and systems of the present invention, as described above and shown in the drawings, provide for an EFB with superior properties including small form factor, protection against airborne contaminants, and efficient heat removal. Moreover, the ease with which the fan modules can be changed out allows EFB's constructed in accordance with the present invention to be maintained onboard an aircraft during fan module replacement, which can increase the time between removal of the EFB itself from the aircraft for maintenance or replacement.

While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. An electronic flight bag computer for providing flight data to aircraft pilots comprising a housing defining first and second compartments that are fluidly isolated from and in thermal communication with one another, wherein the first compartment contains electronic components connected to a user interface on an exterior portion of the housing for providing interactive flight related computation functions to a user, wherein the second compartment contains a forced convection cooling component in thermal communication with the electronic components, and wherein the forced convection cooling component directs a flow of cooling fluid into the second compartment to convey heat produced by the electronic components out of the housing, such that the cooling fluid in the second compartment remains fluidly isolated from the electronic components in the first compartment of the housing, wherein the second compartment includes a heat exchanger in thermal communication with the electronic components of the first compartment, wherein the forced convection cooling component includes a fan in the second compartment of the housing, wherein the housing includes an intake port proximate the fan and an exhaust port proximate the heat exchanger, wherein the intake port and exhaust port are each defined in separate removable access panels of the housing, and wherein the removable access panels are configured to be removed and replaced from the housing to provide access to the second compartment of the housing while maintaining the first compartment of the housing fluidly isolated from the second compartment of the housing.

2. An electronic flight bag computer as recited in claim 1, wherein the forced convection cooling component includes a fan configured to direct cooling air from outside the housing into the second compartment and to direct heated air from the second compartment to outside the housing.

3. An electronic flight bag computer as recited in claim 1, wherein the forced convection cooling component includes a fan configured to direct air from outside the housing into the second compartment and to direct heated air from the second compartment to outside the housing, wherein the fan is electrically connected to the electronic components in the first compartment of the housing by a wire harness for providing power to the fan.

4. An electronic flight bag computer as recited in claim 1, wherein the first and second compartments of the housing are in thermal communication by way of a thermally conductive metallic path component configured to conduct heat from the first compartment to the second compartment.

5. An electronic flight bag computer as recited in claim 1, wherein the electronic components include a processor in the first compartment of the housing with a heat receiver, wherein the second compartment of the housing includes a heat exchanger spaced apart from the processor, and wherein a thermally conductive metallic path component thermally connects the heat receiver in the first compartment to the heat exchanger of the second compartment.

6. An electronic flight bag computer for providing flight data to aircraft pilots comprising:
 a) a housing defining first and second interior compartments therein, wherein the first and second interior compartments that are fluidly isolated and in thermal communication with one another, wherein the first compartment contains electronic components connected to a user interface on an exterior portion of the housing for providing interactive flight related computation functions to a user; and
 b) a removable fan module in the second compartment of the housing, wherein the fan module is configured and adapted to direct a flow of cooling fluid into the second compartment to convey heat produced by the electronic components out of the housing, such that the cooling fluid remains fluidly isolated from the first compartment of the housing, wherein the fan module is configured and adapted to be removed and replaced from the second compartment of the housing while maintaining fluid isolation between the first and second compartments of the housing, wherein the second compartment includes a heat exchanger in thermal communication with the electronic components of the first compartment, wherein the fan module in the second compartment of the housing includes a fan, and wherein the housing includes an intake port proximate the fan and an exhaust port proximate the heat exchanger, wherein the intake port and exhaust port are each defined in separate removable access panels of the housing, and wherein the removable access panels are configured to be removed and replaced from the housing to provide access to the second compartment of the housing while maintaining the first compartment of the housing fluidly isolated from the second compartment of the housing.

7. An electronic flight bag computer as recited in claim 6, wherein the fan module includes a fan configured to direct cooling air from outside the housing into the second compartment and to direct heated air from the second compartment to outside the housing.

8. An electronic flight bag as recited in claim 6, wherein the fan module includes a fan configured to direct cooling air from outside the housing into the second compartment and to direct heated air from the second compartment to outside the housing, wherein the fan is electrically connected to the electronic components in the first compartment of the housing by a wire harness for providing power to the fan.

9. An electronic flight bag as recited in claim 6, wherein the fan module includes a fan configured to direct cooling air from outside the housing into the second compartment and to direct heated air from the second compartment to outside the housing, wherein the fan is electrically connected to the electronic components in the first compartment of the housing by a docking connection for providing power to the fan.

10. An electronic flight bag computer as recited in claim 6, wherein the first and second compartments of the housing are in thermal communication by way of a thermally conductive metallic path component configured to conduct heat from the first compartment to the second compartment.

11. An electronic flight bag computer as recited in claim 6, wherein the electronic components include a processor in the first compartment of the housing with a heat receiver, wherein the second compartment of the housing includes a heat exchanger spaced apart from the processor, and wherein a thermally conductive metallic path component thermally connects the heat receiver in the first compartment to the heat exchanger of the second compartment.

12. An electronic flight bag computer as recited in claim 6, wherein the fan module is configured and adapted to be removed and installed from the second compartment of the housing with the housing on board an aircraft.

13. An electronic flight bag computer as recited in claim 12, wherein the fan module and electronic components are configured and adapted to continue operation of the electronic components throughout removal of the fan module from the second compartment.

14. An electronic flight bag computer as recited in claim 6, wherein the fan module is mechanically connected to the housing by at least one connection of a type selected from the group consisting of sliding, stuffing, clipping, strapping, sticking, and fastening.

\* \* \* \* \*